United States Patent Office 3,249,919
Patented May 3, 1966

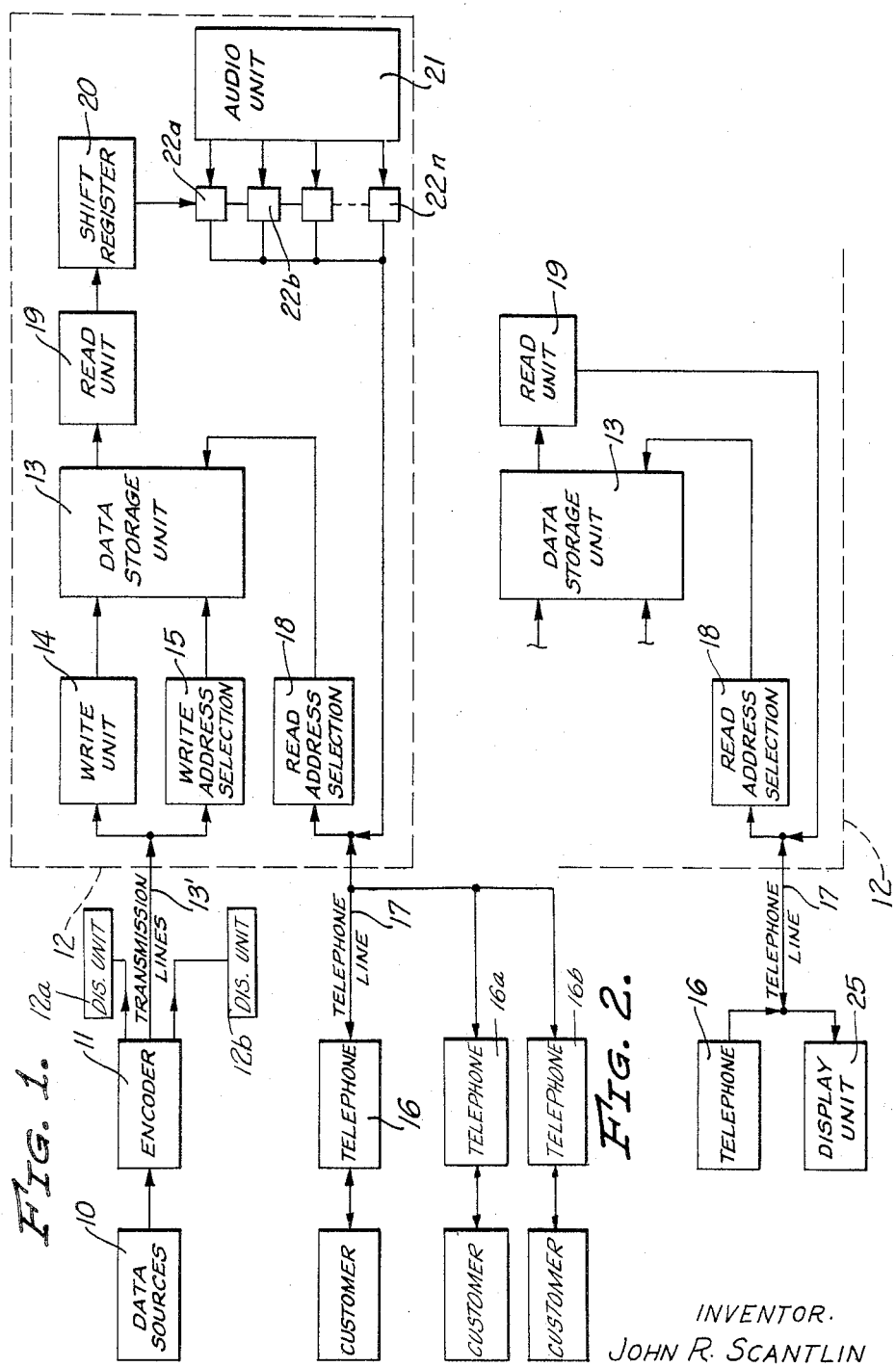

3,249,919
SECURITIES QUOTATION APPARATUS
John R. Scantlin, Los Angeles, Calif., assignor to Scantlin Electronics, Inc., Los Angeles, Calif., a corporation of Delaware
Original application May 10, 1960, Ser. No. 28,103, now Patent No. 3,082,402, dated Mar. 19, 1963. Divided and this application Feb. 4, 1963, Ser. No. 255,940
1 Claim. (Cl. 340—152)

This invention relates to apparatus suitable for storing and disseminating data such as securities prices and the like.

This application is a division of my copending application Securities Quotation Apparatus, Serial No. 28,103, filed May 10, 1960, now Patent No. 3,082,402.

In general, the invention contemplates an apparatus in which a large quantity of data can be stored and revised at will and in which any portion of the stored data can be disseminated in response to an injury. It is an object of the invention to provide an apparatus which can accept incoming data from one or several sources and which can accept data arriving in random sequence. A further object is to provide such an apparatus wherein the stored data can be revised from time to time as replacement data is received. Another object is to provide an apparatus which can store an extremely large quantity of data such as the prices for all securities listed on the major securities exchanges while providing an economic service to those wishing information on securities prices.

It is an object of the invention to provide a data storage and dissemination apparatus which utilizes a single large storage unit at a central location with the storage unit being accessible to a large number of individuals for inqueries by telephone line or other communication systems.

It is an object of the invention to provide an apparatus including a data storage unit having a plurality of data storage zones, read means for reading data from a selected zone of the storage unit, and means for coupling the read means output to an output line. A further object is to provide such an apparatus including an audio unit having a plurality of speech storage units and control means for selectively coupling the speech storage units to the output line as a function of the data read from the data storage unit. Another object is to provide such an apparatus wherein a visual display or record may be created at the source of the inquiry.

It is an object of the invention to provide an apparatus for storing and disseminating securities prices and the like including an encoder for converting the incoming data to a predetermined code with the data having an identification section and an information section, a data storage unit having a plurality of data storge zones with each zone having an identification code, means for writing the information section of the data into the data storage unit, write address means for selecting a storage zone for said write means as a function of the identification section of the incoming data, an inquiry line, means for reading data from the data storage unit, read address means for selecting a storage zone for the read means as a function of an inquiry on the inquiry line, and means for coupling the read means output to the inquiry line.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:

FIG. 1 is a block diagram showing a preferred form of the present invention; and FIG. 2 is a block diagram showing an alternative type of output arrangement for the apparatus of FIG. 1.

The data to be handled in the apparatus of the present invention may come from a number of sources, such as the securities prices and quotations of the New York and American Stock Exchanges. These sources are indicated in FIG. 1 at 10. The data is converted to a suitable code for use in the apparatus by an encoder 11 and is then transmitted to a disseminating unit 12 over a transmission line 13'. Typically, the encoder 11 would be located at New York City and a disseminating unit 12, 12a, 12b, etc., would be located in each of the other major cities in the country, with the encoded data being sent to each disseminating unit via appropriate transmission lines.

Each disseminating unit includes a data storage unit 13 having a write unit 14 for writing data into the storage unit and a write address selection unit 15 for determining the location of each piece of data written into the storage unit. A customer directs an inquiry to the disseminating unit over an inquiry line, such as a telephone 16 and a telephone line 17. The inquiry privides the identity of the particular piece of data sought, the inquiry being directed to a read address selection unit 18 which determines the particular zone of the data storage unit 13 which the read unit 19 reads. The output from the read unit is directed into a buffer storage in the form of a shift register 20.

In the embodiment of FIG. 1, the response to the inquiry of the customer is provided in audible form over the telephone. An audio unit 21 is provided with a plurality of speech storage units, the output of each being controlled by an output switch or gate $22a$, $22_n$. The audio unit gates are selectively actuated by the data stored in the shift register to selectively connect the speech storage units to the telephone line 17 to provide an audible message for the customer.

Typically, the data sources will be the ticker tapes from the securities exchanges. The encoder 11 may be a manually operated keyboard, with the operator visually scanning the ticker tapes. The encoder may feed out the data in two sections, with the first section providing an identification of the particular security and the transaction, i.e., in addition to being a last price, the transaction may also be a high or low or opening price. The second section of the encoded data will be the actual price or quote. Desirably, the identification code for the security should be in the form of the address of this particular piece of data in the data storage unit so as to simplify the over-all system.

The data storage unit 13 ordinarily will be a magnetic storage drum having a plurality of tracks thereon, each divided into a plurality of storage sections, and the location of a particular piece of data will be determined by the track and track section identity. For example, the high price for American Motors may be stored on track 10 in section 47, with the last price in section 48. Then the respective identification codes could be 1047 and 1048. The write address selection unit 15 is actuated by the identification section of the incoming data to cause the write unit 14 to write the information section of the incoming data in the appropriate storage zone of the data storage unit 13.

A large number of customers may utilize the services of one disseminating unit. Inquiries may be addressed to the unit by any suitable means, with the inquiry merely being the identification code of the particular data sought. Typically, inquiries may be made by means of a dial telephone via a telephone line. After being connected to the disseminating unit, the customer can dial the identification code for the data desired, which code is directed to the read address selection unit 18 to cause the read unit 19 to read the appropriate information from the data storage unit. Referring to the example given above, if the customer wishes the last price on American Motors, he could dial the numbers 1, 0, 4 and 7, providing the appropriate identification code.

Typically, the audio unit 21 may be a magnetic drum with a plurality of speech channels thereon, with each channel having a single word or phrase continuously repeated thereon. In one preferred form, the audio unit would have twenty-one speech channels carrying the following phrases: last price, high, low, opening price, zero, . . . nine, and one-eighth, and one-quarter, . . . and seven-eighths. Then as each piece of data is fed out of the shift register 20, the appropriate gate 22 is unblocked to permit the corresponding word or phase to be transmitted to the telephone line. The response to an inquiry might consist of the following phrase: "last price . . . nine . . . three . . . and one-half." Of course, the system could be coded so that a single inquiry would receive the opening, high, low and last price rather than a single one of these, if desired.

Various alternative arrangements of the apparatus can be used. For example, the encoder 11 may be an automatic device which is actuated by the pulse signals which also drive the ticker tape printing devices. Also, the encoder at the data source could be omitted, with each disseminating unit having its own circuitry for converting the pulse signal of the ticker tape line to appropriate form for storage. The customer could be provided with an encoding device such as a keyboard so that he merely has to punch out the appropriate letter symbol for the security in question rather than utilize the identification code for the security. Such an encoder would be similar to the encoder 11, generating the identification code in response to the incoming letter symbols.

An alternative form of output apparatus is shown in FIG. 2, wherein units identical to those of FIG. 1 are identified by the same reference numerals. The audio unit 21 is omitted and the stored data is transmitted directly from the read unit 19 to the customer over the telephone line 17. A suitable display unit 25 is provided at the customer's station to produce a visual record of the desired information. Typically, the display unit may be a printer actuated by the coded data from the storage unit to provide a permanent or semipermanent record for the customer. A ticker tape printer would be a possible display unit although much more rapid printing devices are now available. Alternatively, the data could be displayed in a mechanical register or by means of an electrically illuminated panel.

Specific examples of components suitable for use in the apparatus described above may be found in:

(1) Smith, C.V.L., Electronic Digital Computers, McGraw-Hill Book Co., New York, pp. 352–362.
(2) Flores, I., Computer Logic, Prentice-Hall, New Jersey, pp. 193–194, 261–268.
(3) Hughes, E. S., Jr., The IBM Magnetic Drum Calculator Type 650 Engineering and Design Consideration, Proceedings of the Western Joint Computer Conference, Los Angeles, California, February 11–12, 1954, pp. 140–154.
(4) Phister, M., Jr., Logical Design of Digital Computers, John Wiley & Sons, Inc., New York, pp. 178–195.
(5) Grabbe, E. M., Ramo S., and Wooldridge, D. E., Handbook of Automation, Computation, and Control, vol. 2, John Wiley & Sons, Inc., New York, pp. 5–36 to 5–37.
(6) U.S. Patent to Smith, No. 2,164,956, FIGS. 18 and 34.

Items (1), (2), (3) and (4) show write units, address units, storage units and readout units. Item (2) shows an encoder. Items (5) and (6) show display units.

The securities quotation apparatus of the present invention permits a large number of customers to obtain virtually instantaneous quotations and prices on a very large number of securities while requiring only a very simple unit at the customer's location. While the disseminating unit itself would be relatively expensive, only one such unit would be required to service a large number of customers and, hence, the cost per customer would be relatively small. The rapid and economical quotation service provided by the apparatus of the invention makes it extremely desirable for use in disseminating various types of information, particularly information of the class which varies considerably over a relatively short period of time.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

In an apparatus for disseminating securities price data in response to random inquiries, which data are received from data sources in random order, the combination of:

an encoder for receiving incoming price data, converting the data to a predetermined sequential pulse code having an identification section and an information section and selecting data revisions for transmission to remote storage units;

a pluarlity of disseminating units, each including a magnetic data storage unit having a plurality of storage zones thereon with each storage zone having an identification code, write means for writing the information section pulse code into said storage unit, write address means for selecting a storage zone of said storage unit for said write means corresponding to the identification section pulse code of the encoded incoming data, read means for reading pulse code data from said storage unit, and read address means for selecting a storage zone for said read means corresponding to a coded inquiry;

a one-way transmission line for coupling said encoder to each of said disseminating units respectively, for transmitting all of the selected data revisions in sequential pulse code to each of said disseminating units and storing all of the selected data in each disseminating unit;

a plurality of inquiry generating means for generating an inquiry in pulse code form corresponding to the data identification section of the desired data and including an electrical to audio transducer; and a plurality of two-way transmission lines for coupling each of a group of inquiry generating means to a disseminating unit for transmitting inquiries in pulse code form only to a disseminating unit and transmitting the desired price data in response to the inquiry back to the inquiry generating means from the disseminating unit;

each of said disseminating units including an audio unit with a plurality of continuously repeating speech storage channels, a gate for coupling each of said channels to an inquiry transmission line via an audio to electrical transducer, and a buffer storage for sequentially connecting the data from said read means to said gates in actuating relationship for generating a voice signal corresponding to the selected stored data.

References Cited by the Examiner

UNITED STATES PATENTS

| | | | |
|---|---|---|---|
| 1,862,519 | 6/1932 | Brown | 340—152 X |
| 1,906,646 | 5/1933 | Smith | 340—152 |
| 2,224,244 | 12/1940 | Hicks | 340—154 X |
| 2,321,944 | 6/1943 | Sanders | 179—6 |
| 2,645,764 | 7/1953 | McWhirter et al. | 340—153 |
| 3,133,268 | 5/1964 | Avakian et al. | 340—152 |

OTHER REFERENCES

Publication: Instruments and Automation, August 1956, pp. 1536–1539.

Publication I: Design Techniques for Multiple Interconnected On-Line Data Processors, by F. J. Goffney and S. Levine, Proceedings of the Eastern Computer Conference, Dec. 9–13, 1957, pp. 172–177.

Publication II: Stock Transaction Records on the Datation 205, by A. H. Payne, Proceedings of the Eastern Computer Conference, Dec. 9–13, 1957, pp. 183–186.

NEIL C. READ, *Primary Examiner.*

P. XIARHOS, *Assistant Examiner.*